United States Patent [19]

Altschuler et al.

[11] 4,294,544
[45] Oct. 13, 1981

[54] TOPOGRAPHIC COMPARATOR

[76] Inventors: Bruce R. Altschuler, 123 Thornell, San Antonio, Tex. 78235; John Taboada, 12530 Elm Country La., San Antonio, Tex. 78230; Martin D. Altschuler, 228 Ranch Trail, Amherst, N.Y. 14221

[21] Appl. No.: 63,500

[22] Filed: Aug. 3, 1979

[51] Int. Cl.³ .............................................. G01B 11/00
[52] U.S. Cl. ..................................... 356/376; 356/352
[58] Field of Search ........................ 356/1, 2, 345, 352, 356/354, 355, 356, 357, 358, 363, 376

[56] References Cited

U.S. PATENT DOCUMENTS

| | | | |
|---|---|---|---|
| 3,169,193 | 2/1965 | Strang | 356/363 |
| 3,610,754 | 10/1971 | Pirlet | 356/1 |
| 3,749,493 | 7/1973 | Macovski | 356/2 |
| 4,063,283 | 12/1977 | Rider et al. | 356/1 |
| 4,070,683 | 1/1978 | Altschuler et al. | 356/2 |
| 4,175,862 | 11/1979 | DiMatteo et al. | 356/2 |

Primary Examiner—R. A. Rosenberger
Attorney, Agent, or Firm—Donald J. Singer; Willard R. Matthews

[57] ABSTRACT

Three-dimensional (3-D) topographic data defining a remote surface in terms of the 3-D positions of $M \times N$ sample points on that surface may be obtained by (1) illuminating the scene with an array of $M \times N$ (simultaneous) laser beams, (2) sequencing the array of laser beams through a series of mathematical patterns (space coding) by means of a programmable electro-optic shutter, (3) recording by an imaging device the illumination reflected from the surface during the projection of each mathematical pattern, (4) analyzing the images to obtain the three-dimensional locations of each of the $M \times N$ illuminated points on the surface which are visible to the camera or imaging device, and (5) determining which of the laser beams in the array are not visible to the imaging device. (N and M are any positive integers consistent with the device proposed; typically $M=N=128$, so that $M \times N = 16384$ points.) Mechanization for rapid three-dimensional mapping of the surface involves an array of laser beams illuminating the surface, a programmable electro-optic shutter to switch on and off subsets of laser beams in the array and thereby to input the space code projected on the surface, a (usually narrow bandpass) video camera to capture the reflected images of the space coded surface from a given perspective (and if necessary from various other aspect angles), and a device to synchronize the electro-optic shutter with the video camera. Space coding of the light beams is used to correlate each spot seen on the surface with the corresponding beam in the laser beam array. A space code for an array of beams arranged in M rows and N columns reduces the number of images, I, necessary for correlating all light spots seen on the surface to $I = 1 + \log_2 N$ where N is also the number of columns of the electro-optic shutter whch can be individually switched. The device achieves 3-dimensional topographic mapping much faster than laser rangefinder and optical devices because it can locate $M \times N$ surface points with only $1 + \log_2 n$ images (or patterns); it has much greater signal to noise capability than conventional light devices (it can work in daylight for a great variety of surface textures and uses non-moving, vibration-free components during data collection), and it is unambiguous in its mathematical results for all illuminated and visible surface points within its operating range.

The invention differs from stereophotogrammetry by using one "active" device (the laser beam array) and one passive camera rather than two passive cameras as in conventional stereophotogrammetry. A system of several "active" devices (laser beam arrays) and several passive cameras is also comprehended if the object to be interrogated is very rough, convoluted, or has many sides.

21 Claims, 11 Drawing Figures

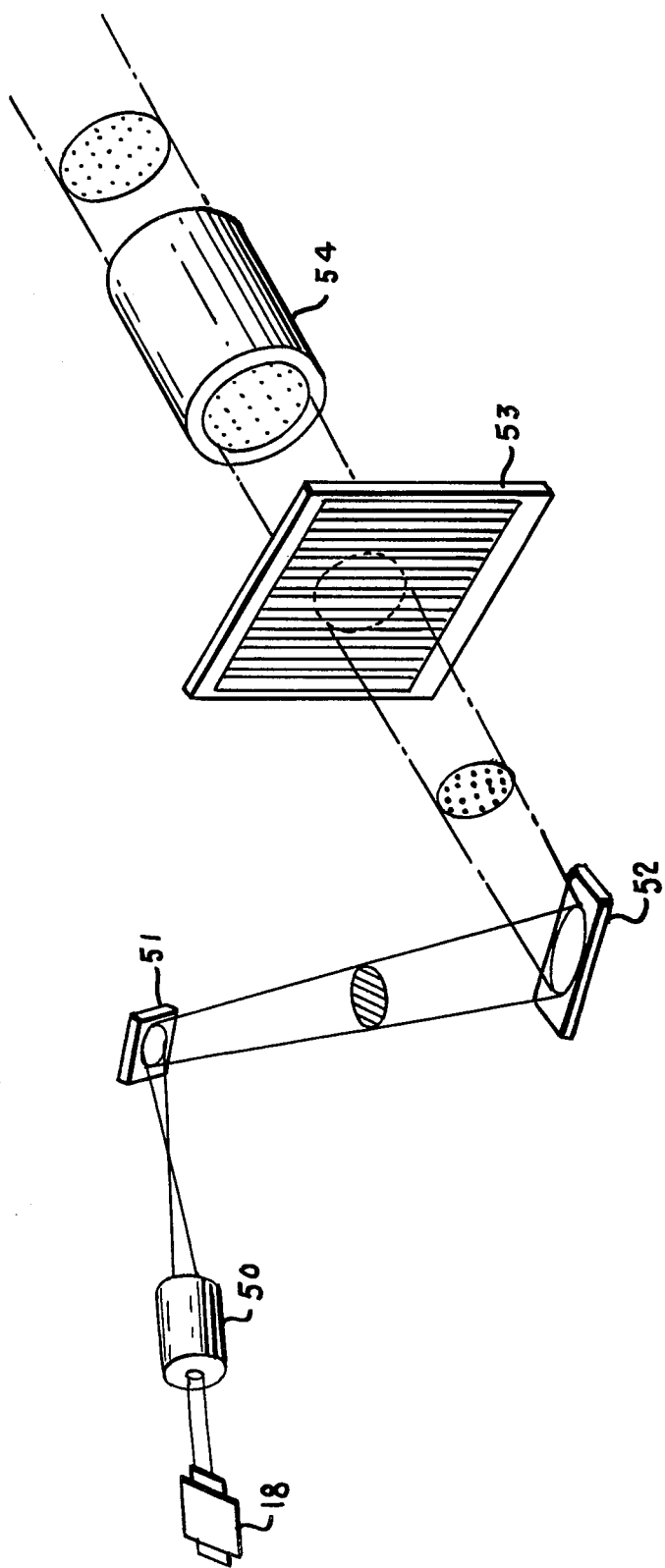

DIRECTION OF COLUMNS FOR SPACE-CODING

IMAGE 1 FULL SCENE (ALL COLUMNS ILLUMINATED)

IMAGE 2 HALF SCENE (COLUMNS 11, 10 ILLUMINATED)

IMAGE 3 QUARTER SCENE (COLUMNS 11, 01 ILLUMINATED)

TOPOGRAPHIC COMPARATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to comparative topographical mapping and in particular to a method and means for remotely and non-destructively obtaining three dimensional topographical data from an object using a two dimensional scene recording device.

Manufacturers may soon have available the technology to entirely automate the fabrication of products containing complex subsystems and complicated surface geometries. The potential technology for automated fabrication is called "Autoreplication". In its ultimate form, Autoreplication will permit any existing object to be rapidly and automatically replicated in any specified material, and any idea for a shape or form could be automatically transformed into a real object. Autoreplication may shorten the lead time between initial design and finished product, enlarge production capacity, conserve materials, maximum product performance, permit the use of new materials and fabricating methods, and reduce unit manufacturing cost.

In the medical area, Autoreplication may lead to new reconstructive surgical techniques, in which the surgeon requests and receives precisely replicated human structures custom manufactured during the surgical procedure. The replicated structures would then be surgically placed for functional or esthetic restoration.

The automated replication concept, however, requires a device capable of automatically inspecting any specified object, from a distance, and rapidly providing numerical spatial data (i.e., three-dimensional spatial coordinates) which mathematically defines, in three-dimensional space, any surface or surfaces comprising the object. Given such a device, precise numerical coordinate 'maps' could be sequentially produced of the original object or object design, the material being processed, and the finished products. To date, the lack of such a universal spatial mapping and comparison device has been a limiting factor in any proposal to automate the replication of any unknown, arbitrarily curved object.

The various state-of-the-art approaches to providing remote topographical data have, in general, proven unsatisfactory. A two-dimensional television or photographic image of a scene usually contains insufficient information for a three-dimensional reconstruction of the scene. To obtain the additional information needed for three-dimensional mapping, a scene can be analyzed passively by stereophotogrammetry or actively by introducing coded illumination. Generally, stereophotogrammetry requires a human operator to determine corresponding scene positions in different photographs, and is therefore too slow for real-time applications. Automated stereo methods require considerable analysis. Methods of actively interrogating a scene (by applying various kinds of light to the scene) have been used in recent years. Holography requires the interference of phase coherent light beams (one beam scattered off the scene and one reference beam) but post-analysis is often difficult. Although three-dimensional information has been obtained from illumination of the scene from different directions and by the application of light grids and light strips it does not appear that these methods have been used for portable real-time surface mapping applications.

Furthermore, these methods are not completely automatic and cannot provide mathematically unambiguous surface topography. Also, laser rangefinder which illuminates only one point at a time are too cumbersome for many applications.

There currently exists the need, therefore, for a comparative topographic mapping device that will automatically inspect any specified object, at significant distances, and rapidly provide numerical spatial data which mathematically defines, in three-dimensional space, any surface or surfaces comprising the object. The present invention is directed toward satisfying that need.

SUMMARY OF THE INVENTION

The invention is comparative topographical mapping device that remotely and non-destructively records and analyzes the surface topography of any given object, producing a numerical topographic map which defines the object's surface geometry. It generates and projects a programmed sequence of coded arrays of discrete bright beams onto an object or specimen. The bright beams are generated optically from a single coherent light source and an optical arrangement which includes two optical shearing plates, and assorted beam steering devices. A rectilinear array of bright beams thus generated is projected through an electro-optic encoder or shutter device. The encoder consists of columns of electro-optic material with birefringence which when passed through a polarizer creates the effect of variable optical density. The optical density of each column of this encoder shutter can be independently varied (controlled) by changing the electronic-electrical inputs. The encoder shutter is programmed to transmit a sequence of various subsets of the beams of the laser array. Each subset corresponds to a coded pattern which will illuminate the surface being interrogated. After each pattern is projected and imaged the various columns of the encoder shutter reconfigure in preparation for transmission of another pattern. The number of pattern changes necessary for data analysis is equal to one more than the log to base 2 of columns present in the beam array (for the case of binary coding). Each column of electro-optic material (or opaque shutter in the case of a mechanical system) is directly aligned so that an individual bright beam projects into the electro-optic column. By programming the columns to change optical density, it is possible to vary the intensity distribution of the beam array projected onto a specimen (to be mapped) and thereby project different patterns for rapid space-coding of a scene (object). A scene recording device such as a videocamera and videostorage device records each pattern (distribution) of the beam array as reflected from a selected specimen. With the camera at a different perspective than the beam array the reflection of each beam array subset (in the sequence of pattern) is recorded as an image of points where geometric pattern is a function of the surface topography of the specimen being interrogated. The set of recorded images, that is, the set of two dimensional images of the different reflected beam array patterns, is data-processed to compute a resultant three-dimensional number map which defines the specimen's surface topography to the extent visible from the position of the videocamera. Error checks are given by the processor and surface areas illuminated but not visible to the videocamera (and therefore not mapped) are indicated. The apparatus may be moved in order to generate another sequence of beam array patterns and/or to record the specimen from another direction. This new surface information is added to the topographic information derived for the first direction, and a new revised numerical topographical map of the 3-D surface of the specimen is computed. Additional integration, summing, and etc. of additional views may be accomplished. The derived 3-D numerical topographical maps may be used for various analyses, comparisons, etc., in conjunction with suitable mathematical programs, or as input to numerical-controlled milling or fabricating machines, or to other devices. The invention does not generate any vibration and may be adapted for safe use in-vivo in a clinical environment, or in areas where hazardous environments exist (such as in areas containing radioactive materials). It may be used as an input device to artificial or robot intelligence machines, as well as to numerical-control fabrication devices.

Although the laser beam array is treated here as a rectilinear array, the principle remains the same if the laser beams are configured in circular arrays, unevenly-spaced linear arrays, etc. Also, many different space codes are possible in addition to the binary code dicussed here; again, the basic principle is the same.

It is a principal object of the invention to provide a new and improved comparative topographical mapping device.

It is another object of the invention to provide a comparative topographical mapping device that will create a numerical topographic map defining the coordinates in x, y, z space (or other coordinate system as specified) of a specimen object.

It is another object of the invention to provide a comparative topographical mapping device that will error check itself, defining inadequate scene recording and indicating where the surface may not be totally mapped due to recording discrepancies or inadequate viewing directions.

It is another object of the invention to provide a comparative topographical mapping device in which the three dimensional surface topography of a specimen object (or specified portion thereof), may be defined completely from one viewing direction (the laser array projecting from a different direction), except for those surface regions invisible from the viewing direction, as for example those surface regions hidden behind foreground objects and, therefore, blocked from the view of the scene regarding device.

It is another object of the invention to provide a comparative topographical mapping device in which the three-dimensional surface topography of a specimen object may be defined completely by compiling views from more than one direction.

It is another object of the invention to provide a comparative topographical mapping device employing an array of light beams that illuminates the surface to be analyzed and that are adapted to space coding.

It is another object of the invention to provide an illumination spot array generator in which only a single light source is needed to generate a beam array and in which beam array generation is optical and vibrationless.

It is another object of the invention to provide comparative topographical mapping device having a space coded mode of operation for correlating illuminated surface spots with both imaged spots and individual laser beams, and employing a space code that limits the number, I, of images required to $I = 1 + \log_2 N$, where N is the number of independently programmable columns (or rows depending on the design) in the shutter encoder.

It is another object of the invention to provide a comparative topographical mapping device in which analysis of the scene is done automatically by a data processor.

These together with other objects, features and advantages of the invention will become more readily apparent from the following detailed description when taken in conjunction with the illustrative embodiments in the accompanying drawings.

DESCRIPTION OF THE DRAWINGS

FIG. 6 is a perspective illustration of the spot array generation and coding feature of the invention;

DETAILED DESCRIPTION OF THE PREFERRED EMBODIMENT

Purpose and Application of the Invention

Figure 1:
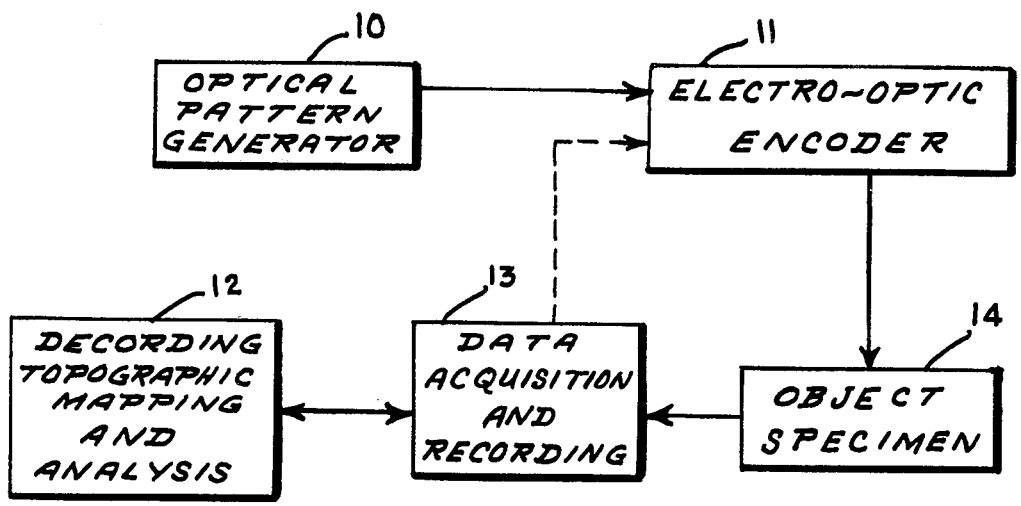
FIG. 1 is a fundamental functional block diagram of the invention.

The topographic comparator herein after described is adapted to solve many problems which involve rapid and remote surface topographic measurement. It solves the problem of remotely and non-destructively measuring an arbitrary convoluted surface topography, from as few as one sighting direction, and can instantly (in real-time) analyze the acquired data to produce a three-dimensional numerical topographic map. The numerical topographic maps generated may be further data processed with suitable programming to:

(1) create analog topographic maps with isocontoured surfaces; (2) do pattern classification of shapes; (3) compare the measured specimens with known standards or with known standards or with other specimen; (4) detect vibration or movement; and (5) rotate, translate, scale or interactively reshape an object's image. The invention may be used to obtain surface metrology of any object from fractions of a millimeter to several meters or more in size, depending on the lens combinations used, the resolution requirements, the number of dots used in a dot array, and the applications need. The invention also solves the problem of generating a rectangular array of discrete bright beams which can project through space as either a collimating or expanding pattern, in which all beams are in light phase, coherent, and monochromatic. The device disclosed is also capable of decoding rectangular dot arrays or fringe patterns and translating them into useful numerical topographic data. The invention solves the problem of addressing each dot in a dot array pattern. It provides means for safely, remotely, nondestructively, and rapidly obtaining in-vivo clinical surface maps of diagnostic value for those in the health sciences professions. The invention's mapping and analysis ability will quantitatively obtain and define critical information necessary for health sciences applications in such areas as comparative growth, surgical healing, diagnosis, treatment evaluation, prostheses fabrication, orthopaedic design, orthodontic and cranio-facial diagnosis and treatment, and the detection and evaluation of deformations and abnormalities. It permits right/left symmetry geometry for right/left pair fabrication of mapped objects. Near real-time quality control, metrology, and interactive and/or automated corrections, of machined, cast, or otherwise fabricated parts or components, or parts or components in the process of being fabricated, may be obtained. This is because this the device will map a part at any stage in its fabrication, and either indicate discrepancies in surface geometry or program the fabricating machines to physically compensate and correct for these descripancies. Thus parts (machine, anatomic, etc.) may be precisely corrected, or a fabricating machine or tool made self-correcting, during the process by which the part is being fabricated, to compensate for the problems of wear, eccentricities, environmental conditions, etc., in order to produce a part of the exact geometric shape desired. Numerically controlled fabrication machines may use data from the device to replicate any surface mapped by this invention. Human interaction with the system allows reshaping, recontouring, or redesigning of parts before fabrication, for such applications as dental or medical restorative prostheses fabrication, or for engineering design and testing, or for diagnostic or experimental manipulations or studies. The invention will solve the problem of metrology of radioactive materials or parts, or of parts containing or contaminated by radioactive materials, for the fabrication, accident investigation, assembly, quality control, and inspection, of such parts, since it maps remotely and requires no complicated orientation process or human hands-on application of the items to be mapped. In the same manner, sterile surgical fields may be mapped, and clean-room fabricated items may also be inspected or surveyed. The invention will also map objects in which non-remote metrology would be destructive—such as in measuring semi-solid or liquid materials surfaces, or thin membranes or molten materials. Because of the error correction capability it may be applied to assist an 'artificial intelligence', or robot machine, to learn to manipulate, pattern recognize, or fabricate, in an accurate manner, or to improve its performance. Furthermore, the invention will solve the problem of a rapid security identification system by its ability to compare geometric shapes, such as faces. It may also be used as an accurate self-positioner, or automatic positioner, or feed-back or interactive positioning indicator, wherever accurate positioning or repositioning or orientation or alignment is required.

Specific Features and Advantages of the Invention

The topographical comparator of the invention exhibits the following advantages over prior art devices and systems.

(A) The 3-D surface topography of a specimen object (or specified portion thereof), may be defined completely from one viewing direction, except for those surface regions invisible from the viewing direction, as for example those surface regions hidden behind foreground objects and, therefore, blocked from the view of the scene recording device.

(B) The 3-D surface topography of a specimen object (or portion thereof), may be defined completely by compiling views from more than one direction, provided that every surface element (region) is observable from at least one of the viewing directions.

(C) The invention will error-check itself, defining inadequate scene recording, and indicating where surfaces may not be totally mapped due to recording discrepancies or inadequate viewing directions.

(D) The invention will create a numerical topographic map defining the coordinates in x, y, z space (or other coordinates system as specified) of a specimen object (interrogated surface).

(E) The invention will perform a variety of analyses and mapping transformations on the numerical topographic map for comparison purposes, among which are rotation, translation, scaling and interactive alteration of the numerical values of the surface map. Curve fitting, smoothing, averaging, edge enhancing, image deblurring, compiling of several maps, statistical analyzing, isocontouring and isometric projecting, etc., may be performed with the numerical topographic maps, using data processing and image analysis techniques. Different specimens mapped by this technique may be quickly and automatically compared with respect to height, area, volume, orientation, stress, strain, and vibration; pattern classification with surfaces so mapped allows the surface of a specimen to be classified as normal or abnormal relative to a sample population or a standard.

(F) The invention generates through space a rectilinear pattern of discrete bright beams, in which at any plane mutually perpendicular to the beam's direction, the beams are mutually in phase, monochromatic, and spatially and temporally coherent, and arranged in a specified, accurately repeatably pattern or array.

and in which the beam array pattern may remain collimated or may be divergent in space depending on specified lenses, shearing plates, and angulations of optics used.

and in which the spatial frequency of the bright beams may be adjusted from microscopic to macro spatial frequencies (from one wavelength of light to many meters).

and in which the total number of bright beams in the beam array may be increased or decreased.

(G) The invention codes or addresses the individual bright beams within the beam array. This is done by use of spatial or temporal coding methods. A mechanical or electro-optic shuttering system is used for the binary coding of the array.

(H) The pattern of discrete bright beams incident on an object or specimen to be mapped, is reflected (scattered). The array of dots (in this case rectangular) reflected from the object (into the viewing direction) is distorted from the original (in this case rectangular) array pattern to a degree dependent on the surface geometry of the specimen.

(I) The scene (object), is recorded by a scene recording device (for each specified orientation), as a sequence of video raster scanned images, cinematic images, photographic images, or other imaging methodology, in which the first image records the reflection of the entire beam array pattern from the specimen, while subsequent images sequentially record the reflections of space-coded subsets of the beam array pattern as the shuttering system sequentially transmits or blocks rows or columns (i.e., horizontal or vertical strips) of the original projected beam array in a specified binary (or other) coding sequence.

(J) Using a shutter system, binary (or other) coding of the beam array is accomplished. One method of coding is to program a series of columns of electro-optic material (such as PLZT or liquid crystal), arranged in a regularly spaced vertical or horizontal strip arrangement, in which the optical density* of each of the vertical strips of the rectangular beam array pattern may be individually controlled or varied from complete light transmittance to complete light absorption and/or reflectance by electronic or electrical means

[*note: Actually, the crystal columns when activated rotate the polarization of the light to a degree proportional to the input signal. The laser light source is itself polarized, and therefore the generated beam array is uniformly oriented in one polarization plane. A polarized beam array is thus projected to the encoder. For each programmed electrical signal, the encoder rotates the polarization of specified columns a specified amount. When the beam array continues and passes through a polarizer plate—those beams passing through the crystal columns whose polarization was rotated by the encoder, are filtered to a degree proportional to their polarization rotation. An apparent change in the optical density of columns of the encoder is the effect. Thus specified columns of the encoder may block the light of corresponding columns of beams from passing beyond the polarizer plate. The polarizer plate, the crystal columns, and the programmed, generated electrical signals to the individual columns, comprise the shutter or encoder system. The shutter system sequence is synchronized with the scene recording device so that at least one complete image is recorded of one shutter pattern before the shutter is reconfigured.]

and in which the number of columns of material correspond to the number of bright beams in any one row of the beam array
 and in which the programming of the electrical-electronic input to the individual electro-optic crystals causes the changing of the optical densities of each column to form a definite and repeatable sequence of patterns of the rectangular beam array.

A second method is an electromechanical shutter consisting of columns of polarized, or opaque, or mirrored material, which may be rotated or translated away from the corresponding beam paths. An electrical, programmed, signal causes the physical blockage or removal of opaque shutters from each column depending on a specified program. The electromechanical shutter would also be synchronized with the same recording device similar to the electro-optical material method.

(K) Each image recorded is converted to digital form, and images are compiled to decode the dot array pattern reflected from the object.

(L) Only one laser need be used to generate the beam array.

(M) The beam array is generated optically—no moving parts are required. Beam array generation is vibrationless.

(N) The coding of the beam array may be done by an electro-optic programmed shutter, as for example by using PLZT crystals or liquid crystals, so that no moving parts need be required for the shuttering method.

(O) Shearing plates are used in series to generate the array of bright rectangular spots.

(P) Images may be stored by electronic, magnetic, or electro-optic memory devices (such as CCD, CID, RAM, PROM, etc.), each image recording a different space-coded configuration reflected from the scene.

(Q) Each image of the scene is mutually addressable pixel by pixel.

(R) Analysis of the scene is done automatically by a data processor.

(S) The generated 3-D numerical topographic map is usable directly by any device which is capable of using numerical data.

(T) Device is safe for in-vivo use. Device may be used in a clinic, hospital, or clinical environment.

(U) Coding may be binary, temporal, chromatic, or a combination of these.

(V) The discrete beams, and the entire beam pattern, are of high spatial resolution and optical coherence and may be projected over a considerable distance.

(W) The rapidity at which the images are recorded to complete a set of images recording an entire pattern set, from one direction, is only limited by the speed of the scene recording device and the slight time delay to reconfigure the shutter encoder patterns.

(X) The device does not itself produce any vibration. This includes the scene recording and storage portions.

(Y) The invention may be used for interactive feedback, or automatic positioning or repositioning or alignment or realignment in orientation of an object or person.

(Z) The invention may be used in hazardous environments (including) areas where radiation is emitted) because the data acquisition and pattern projection is remotely accomplished, both in a measuring sense and as far as location of human operators is concerned.

Apparatus And Mode Of Operation Of A Preferred Embodiment Of The Invention

The subject invention comprehends a topographic comparator system that topographically maps a surface from laser projected patterns on space-coded scenes, producing a numerical topographic map which defines the object's 3-D topography.

Due to the complexity of the entire invention, and its inherent versatility the functional elements of the invention have been subdivided to more easily describe it. FIG. 1 is a fundamental block diagram illustrating the four 'building blocks' which comprise the invention. These basic building blocks comprise optical pattern generator 10, electro-optic encoder 11, decoding, topographic mapping and analysis function 12 and data acquisition of recording function 13. The system is shown to operate on object specimen 14.

These four fundamental and versatile building blocks, and their mutual interactions, will now be described, keeping in mind that numerous systems can be devised in which slightly altered parameters in each block can permit different applications.

The function of the optical pattern generator 14 is to produce a systematic pattern of collimated bright squares, dots, or lines (in this case a rectilinear array of 128×128 discrete bright squares of monochromatic, coherent, and linearly polarized light, with uniform spot size and spatial frequency). The pattern(s) may be intermittent or continuously generated depending on laser source and configuration, but in this case a single pattern is continuously generated by the optical pattern generator.

The function of the electro-optic encoder 11, is to block selected portions of the array from reaching the object 14, thus systematically reconfiguring the array pattern in a programmed sequence. In the present case, the encoder produces eight different binary space-coded patterns (which includes one unaltered and unblocked array). This is accomplished with a shutter consisting of columns of individually programmable shutter blades (in which the 'shutter blades' are crystals of material whose polarization may be reoriented and thus the optical density changed). Each blade is shuttered according to a programmed plan which enables a total shutter pattern configuration which is different for each image recording.

The function of the data acquisition and recording function 13 is first—to signal the electro-optic encoder 11 to produce the desired set of patterns (in this case eight patterns), second—to synchronize the shutter encoder with the raster scanning recording of each pattern, third—to acquire each pattern reflected from the object completely in a single raster scan (or as an integrated series of scans if needed), fourth—to digitize the analog signal, fifth—to store each recorded and digitized pattern in a storage medium such as a CCD (charge coupled device), and sixth—to selectively and progressively dump the information into the data processor 13 on suitable command.

The decoding, topographic mapping, and analysis function block 12 has, as its function, the mathematical (and graphical) reconstruction of the surface of the object. This is done by calculating a 3-D numerical topographic map as derived from the recorded set of space-coded images of the reflected object (see Mathematical Outline here-in-after described). Block 12 also serves to interactively warn of hidden points in the scene so that other directions of view may be taken as necessary. Block 12 programs the encoder electronics to drive the shutter. It is programmed for analysis as per the application, and may be used as a driver for numerical-controlled fabrication, etc.

Figure 2:
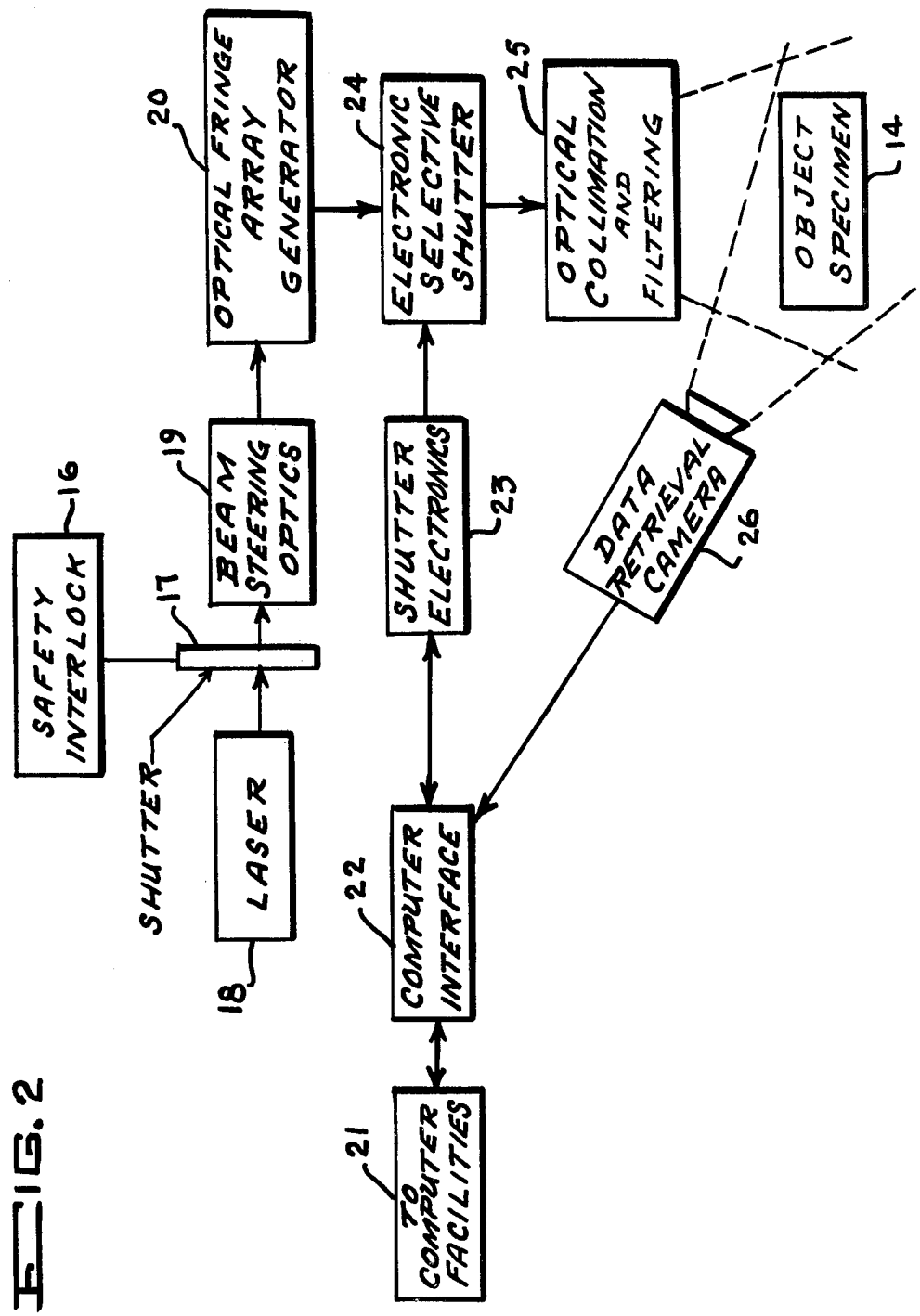
FIG. 2 is a block diagram of the invention illustrating the major components for implementing the functional blocks of FIG. 1.

FIG. 2 is a block diagram of the basic apparatus elements of the invention. Laser 18, shutter 17, safety interlock 16, optical fringe array generator 20, beam steering optics 19 and optical collimation and filtering 25 mechanize the optical pattern generator function of FIG. 1. Shutter electronics 23 and electronic selective shutter 24 provide the electro-optic encoder function. The data acquisition and recording function is mechanized by data retrieval camera 26 and computer interface 22 while computer facilities 21 represents the decoding topographic mapping and analysis function.

Figure 3:
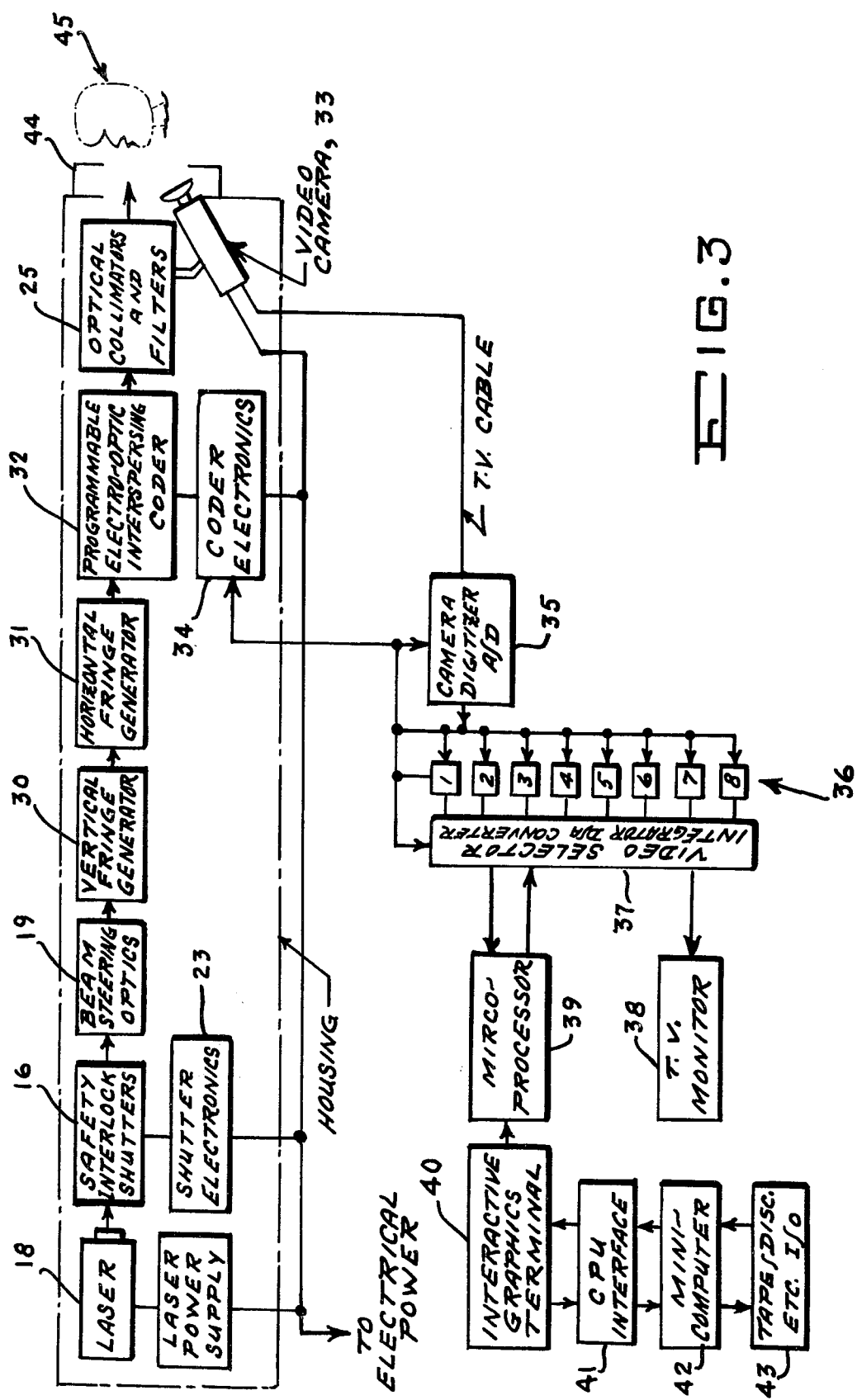
FIG. 3 is a detailed schematic diagram of the invention.
Figure 4:
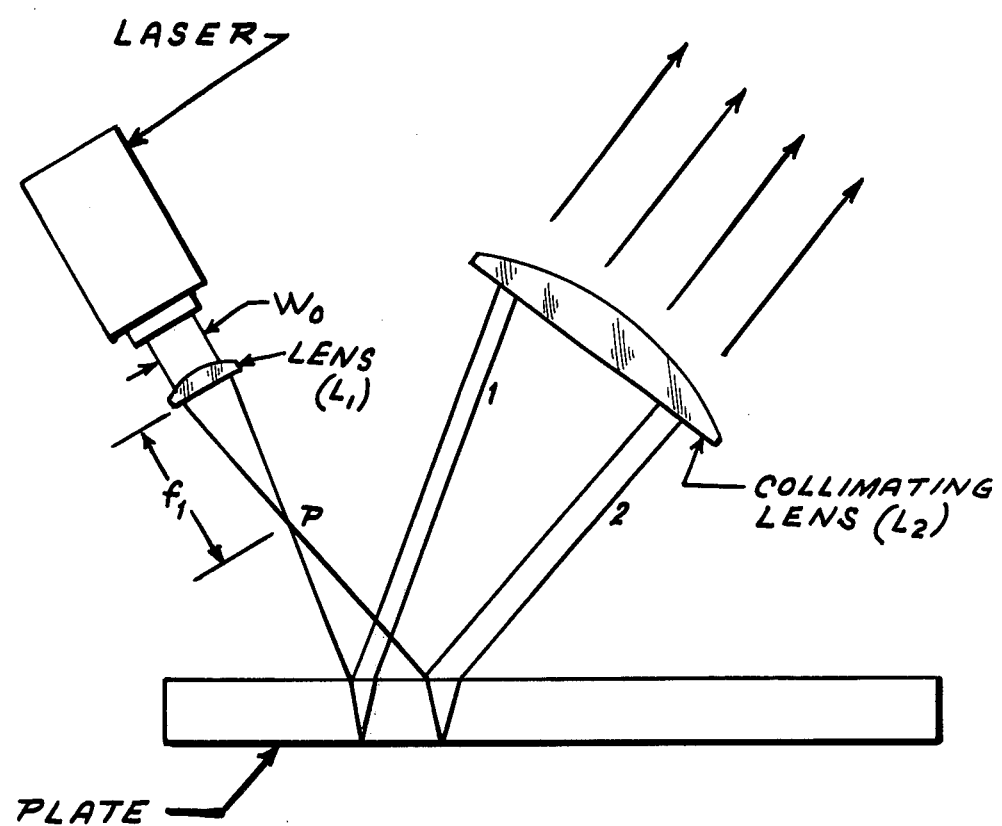
FIG. 4 is a sketch showing means for creating interference fringes.

A more detailed block diagram of the system is shown in FIG. 3. Referring thereto the system is seen to include laser 18, safety interlock shutter 16, beam steering optics 19 vertical fringe generator 30, horizontal fringe generator 31, programmable electro-optic interspersing coder 32, optical collimators and filters 25, coder electronics 34, video camera 33, camera digitizer 35, CCD memories 36, video selector integrator and D/A converter 37, microprocessor 39, TV monitor 38, interactive graphics terminal 40, CPU interface 41, minicomputer 42, and tape/disc recording means 43. By way of example the invention is described in terms of a biomedical application and the object to mapped in the illustration of FIG. 3 is shown as a human face 45.

In general, the object or specimen to be viewed (face 45) is arranged so that it is framed by a reference plane 44 which in turn is mutually perpendicular to the beam path of the optically generated light pattern as shown in FIG. 3. A reference plane is not essential but is convenient for bio medical subjects. The scene recording device, film, photo, or, in this case videocamera 33 is positioned at a convenient angle as shown in the figure and as outlined in the following Mathematical Outline. Verification of the orientation of the camera with the object and pattern generator is accomplished through automated or operator interactive means such as use of a TV monitor in FIG. 3. The operator then starts the sequence of events necessary for mapping the object by opening the safety shutter 16. Safety shutter electronics are coupled interactively to the computer 42 and to the interspersing electro-optic shutter electronics for failsafe operation. If functions 10, 11, 12 and 13 are ready, the safety shutter opens a sufficient length of time to allow a preset number of images to be recorded, then automatically closes. The apparatus is then moved to another directional viewing orientation as desired and the operation is repeated.

Detailed Description Of The Fundamental Functional Blocks Of The Invention

The theory, structure and operation of the above-identified functional components of the invention are hereinafter described separately and in detail having reference to FIGS. 4, 5, 6 and 7.

A pattern generator suitable to use in the invention can be constructed along the design of a device previously patented by Altschuler and Taboada, U.S. Pat. No. 4,070,683, using the front and back reflections of a set of shearing plates (placed in parallel) generating sharp fringe lines. This system generated a rectangular pattern of crossed fringe lines.

However, for the purpose of spatial encoding, an array of lighted, discrete (isolated) points is desirable. A new, unique evolvement of an optical arrangement to accomplish this end is obtained by putting the fringe generating shearing plates in series. This is different from the parallel arrangement as had been done previously; as described in: J. Taboada and B. Altschuler *Applied Optics* 15 597 (1976) (and U.S. Pat. No. 4,070,683).

Optical Pattern Theory: The principle utilized in creating interference fringes (Born and Wolf *Principles of Optics* Pergamon Press, New York 1965) is reviewed with reference to FIGS. 4 and 5: the condition for the creation of interference fringe lines is derived as follows:

Define the path difference between the beams as $\delta 12$ Then:

$$\delta 12 = n(AB + BC) - AD \tag{1}$$

Where n is the index of refraction of the plate and the index of the exterior medium is assumed to be one.

Now:

$$AD = AC \sin \alpha = 2d \tan \beta \sin \alpha \tag{2}$$

and:

$$AB = BC = d/\cos \beta \tag{3}$$

From Snell's law:

$$\sin \alpha = n \sin \beta \tag{4}$$

and 1,2,3:

$$\delta 12 = 2nd/\cos \beta - 2d \tan \beta \sin \alpha = 2nd \cos \beta \tag{5}$$

Due to a $\pi$ phase change at A, interference minima will occur at infinity whenever $$\delta_{12} = 2nd \cos \beta = m\lambda \text{ where } m = 0,1,2,\text{etc} \quad (6)$$

and $\lambda$ is the wavelength.
In terms of $\alpha$ using 4, $$\delta_{12} = 2d(n^2 - \sin^2 \alpha)^{\frac{1}{2}} = m\lambda \quad (7)$$

Figure 5:
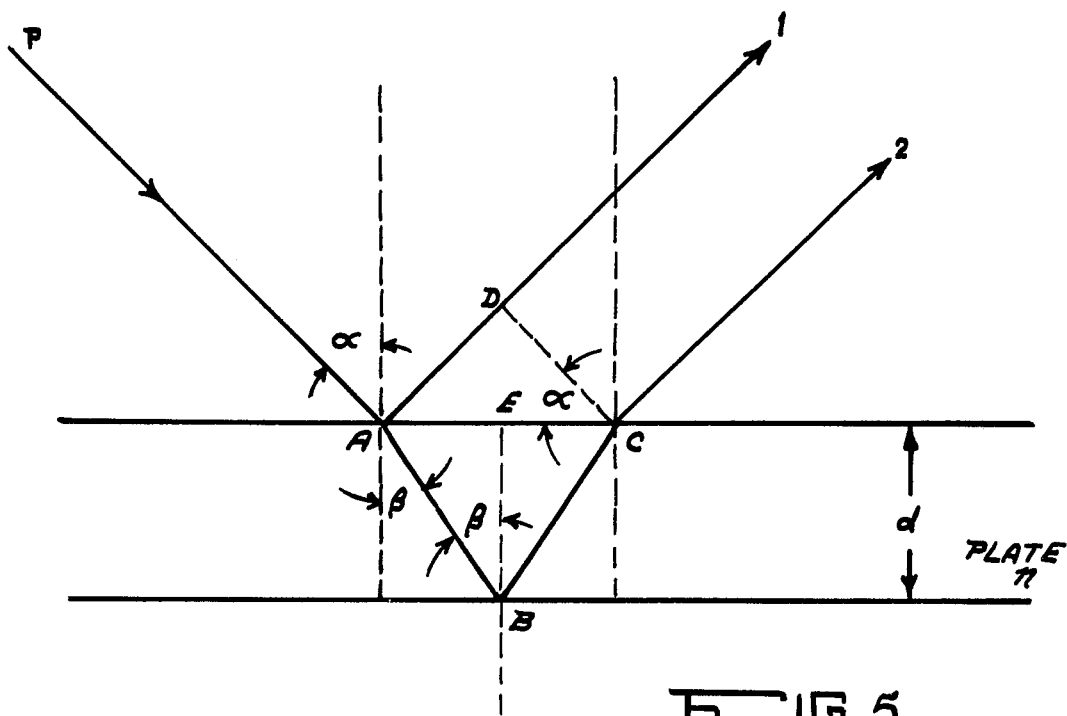
FIG. 5 is a sketch showing the principle of interference in optical pattern generation.

A set of fringes is generated as shown in FIG. 5 by a bundle of such rays from a point P at the focus of LENS (L1) in the beam of a laser with beam diameter $W_o$. Here the angle varies between the two extreme rays (1 and 2) of the diverging beam. The angular periodicity of the fringe minima can be calculated from the divergence of the beam at P and using (7). Differentiating eq 7:

$$\partial \delta_{12} = 2d(n^2 - \sin^2 \alpha)^{-\frac{1}{2}}(\tfrac{1}{2})(-2 \sin \alpha \cos \alpha) \partial \alpha \quad (8)$$

$$\partial \delta_{12} = d(n^2 - \sin^2 \alpha)^{-\frac{1}{2}} \sin 2\alpha \, \partial \alpha$$

Fringe minima will occur with an angular period 2X resulting in a path change of $\lambda$, i.e.,:

$$\partial \alpha = \left(\frac{\lambda}{d}\right)(n^2 - \sin^2 \alpha)^{\frac{1}{2}}/\sin 2\alpha \quad (9)$$

The total number of fringes (N) will depend on the total angular extent of the beam from P, i.e.:

$$N = 2 \tan^{-1}\left(\frac{W_o}{2f_1}\right)/\partial \alpha \quad (10)$$

$$N = 2d \tan^{-1}\left(\frac{W_o}{2f_1}\right) \sin 2\alpha/\lambda(n^2 - \sin^2 \alpha)^{\frac{1}{2}}$$

where $\alpha$ is chosen as the average angle at the plate.

Now if a second partially silvered plate is placed in the path of fringe lines produced by the first plate and in such a way that the plane of incidence on the second plate is perpendicular to the first, the fringe lines will again be broken by interference minima, thus producing an expanding rectangular array of light beams, emanating from a common point. This beam array can be spatially encoded with a special shutter, recollimated and spatially filtered to produce the sharpest points of light in a manner illustrated in FIG. 6. Referring to FIG. 6 the basic elements of the spot array generator described above are shown to be laser 18, beam diverging lens 50, vertical fringe generator 51, horizontal fringe generator 52, programmable electro-optic interspersing coder 53, and collimating and optical filtering lens assembly 54. Other conventional optical system components such as steering mirrors, spatial filters and focusing and collimating lenses (not shown) are also used in the system as needed in a routine manner.

Figure 7:
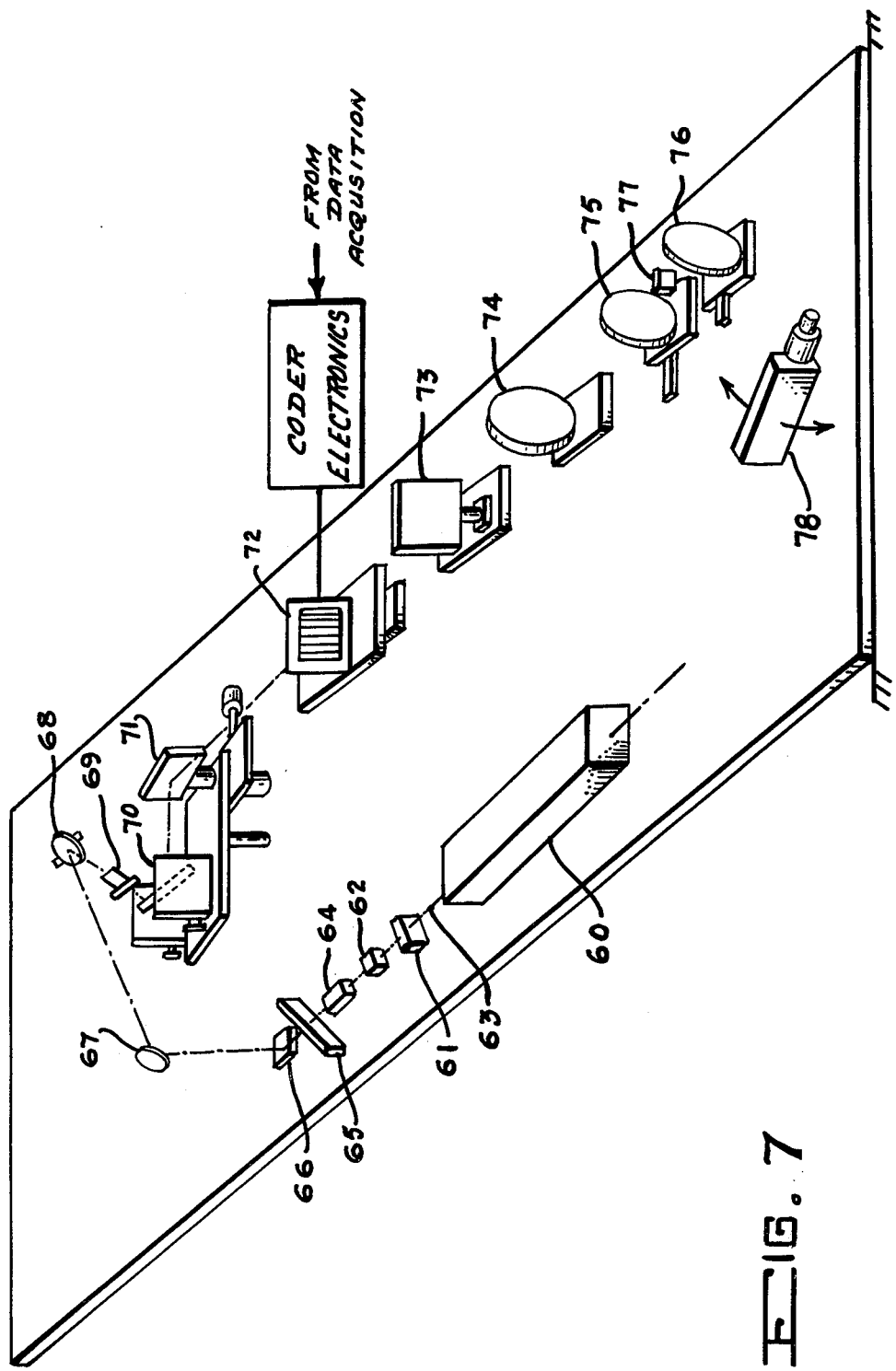
FIG. 7 is a perspective view of the apparatus of the invention.
Figure 8A:
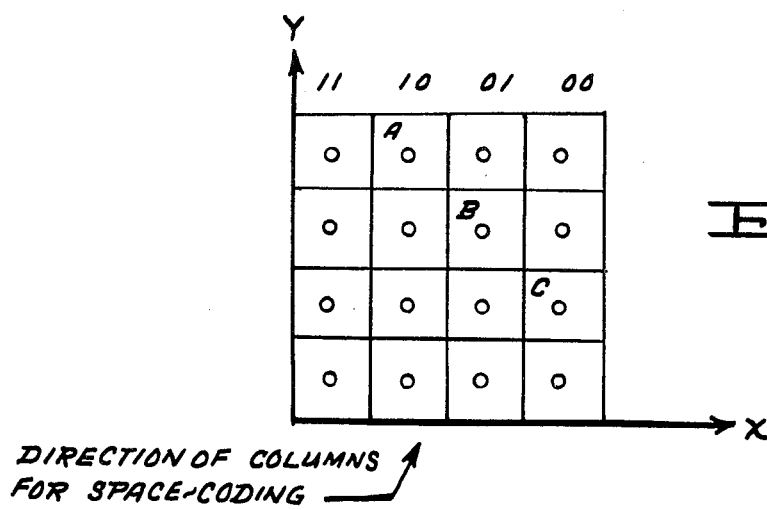
FIGS. 8a, 8b, 8c, and 8d illustrate the principle of space coding used in the invention.
Figure 8B:
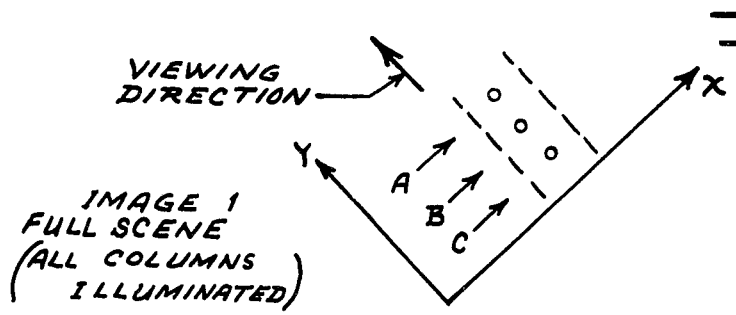
Figure 8C:
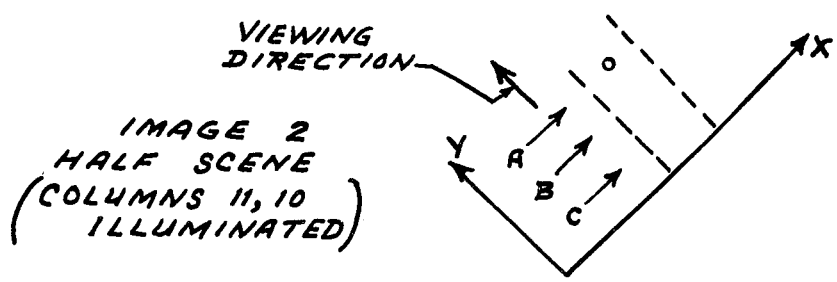
Figure 8D:
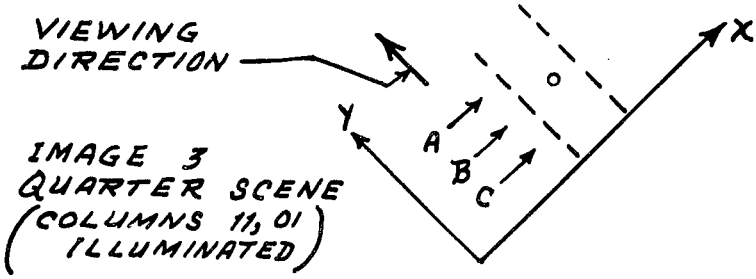

A detailed diagram of the proposed apparatus and embodiment is illustrated in FIG. 7. A laser source such as an Argon ion laser 60 operating with about 400 mW of power at $\lambda = 514$ nm, is spatially filtered to clean up the gaussian beam 63 with a suitable spatial filter 61. A mechanical shutter 62 with timing remote controlled serves as a safety interlock and exposure controller. This element may also be an electronic shutter which is remotely controlled. The beam is then passed through a $\lambda/2$ plate 64 for careful orientation of the angle of polarization. A neutral density filter 65 adjusts the intensity for sufficiency. Optical beam steering means 66, 67 raises the beam and directs it to a shearing plate assembly consisting of the following: a directing mirror 68, a microscopic objective 69 to introduce a large divergence, shearing plates 70, 71 in tandem as described earlier, and precision adjustable rotating platforms (not shown) to orient the beam as it enters the shearing plates in series.

The array of light beams generated by the shearing plate assembly then passes through a programmable interspersed array of rectangular shutters 72, either vertically or horizontally. This shutter assembly can be constructed from mechanically actuated slits, rotating assemblies of rulings, liquid crystal gates, or electro-optic crystal gates. The function of the shutter is to take a timing signal command from the data acquisition subsystem, and blank off rows or columns of beams in a binary coded fashion (other coder schemes are possible but the binary code conserves images and will be presented for the purpose of the specific embodiment). That is, for an array of $128 \times 128$ beams, seven images that are coded, and one uncoded image, are required to uniquely identify each beam in the scene as this array is projected on an object. In the first image, all the beams are transmitted. The shutter is then reconfigured. Then one half the beams are consecutively blocked in the second image while one half are consecutively transmitted. The shutter is again reconfigured. Then the first quarter are passed, the second quarter blanked, etc., so that equal alternating quarters of blockage or transmission occur. Then the first eight are passed, second eight are blocked, etc., and so forth until only alternate columns (or rows) are passed. The use of this coding scheme will be described below, and its theory will be described in the Mathematical Outline.

Since the beams in the array have definite polarization, derived from the laser source, shutter assemblies using electro-optic materials with large Kerr coefficients can be used advantageously. A good candidate for this function is the material PLZT (lanthanum-modified lead zirconate titanate) developed at Sandia laboratories, Albuquerque, NM under US Gov't contract (see J. Thomas Cutchens, et al, "PLZT Electro-Optic Shutter Applications" *Applied Optics* Vol 14, p. 1866 (1975). This material can be cut into a thin wafer and electroded, to create individual shutters which will exhibit half wave plate behavior with the application of appropriate voltages. An appropriately oriented analyzing polarizer 73 then will blank off the beams passing through energized PLZT shutter segments. The coder electronics is a decimal-to-binary decoder-driver with sufficient voltage amplitude to drive the shutters. The coder electronics is controlled by the data acquisition sub-system.

The expanding beam array is collimated with lens 74. The resulting beam spot array is further enhanced in sharpness by a spatial filter including lenses 75 and 76 separated by a distance equal to the sum of their focal lengths. A glass plate 77 with a small occlusion is placed with the occlusion in the center of the Fourier plane. This filters the spatial low frequency components of the spot pattern, see Hecht et al "Optics" 2nd ed. Addison-Wesley, Reading Mass. p. 467. By removing the low spatial frequencies the beam array should be sharply defined. Micrometer positioners (not shown) serve to adjust the optical alignment.

The highly patterned beam array leaving lens 76 is finally projected onto the surface of the object to be analyzed and data is collected with camera 78.

Data Acquisition and Recording

As seen in the schematic diagram of FIG. 3, the videocamera records the object.

The TV or videocamera uses an appropriate lens system or lens and bellows system, or optical adapters, as needed depending on the size of the object or the area to be recorded.

The videocamera 33 produces a standard composite video signal which conforms to EIA RD-170 specifications. Each raster scan is accomplished in 1/30th second. A non-raster scan electro-optic imaging sensing device "camera" may be used in place of a raster-scanning video camera. The videocamera 33 and digitizer 35, as indicated in FIG. 3, is synchronized with the coder electronics 34 of the programmable electro-optic interspersing coder, and with the commands of the microprocessor and/or minicomputer 42. The coder electronics 34 signals the electro-optic shutter to change between raster scans. The camera 32 begins a raster scan after receiving a command from the computer 42. The information from the videocamera 33 is input to the camera digitizer 35. Upon computer command selection, the digital output of the camera digitizer is received by one of the eight image memories 36. The data is a 512×512 pixel image in which each pixel is one of 64 brightness level values. The shutter electronics 23 is signalled to rearrange the shutter pattern between raster scans. The videocamera 33 is then commanded to begin another raster scan, and so on, until all eight image memories are filled, each memory containing a complete, but different recorded pattern as reflected from the object. The data may be removed by computer command in which each memory is appropriately weighted in a number value so that the data is transferred to the computer in an ordered and predetermined sequence. Also the images may first be summed, before entering the computer, if needed. For low light level, (and certain other) applications, more than one raster scan may be needed and more than one memory may be used for each shutter pattern. For that application memories are integrated or summed and sent to the computer, and then a new shutter pattern is ordered and recorded. The system is extremely versatile. For interactive monitoring, and inspection applications, the computer may output a video image which may be stored in the memory and/or displayed or compared with the scene.

For this example application, a 128×128 rectilinear bright spot, or 'dot' array is generated by optical pattern operator function 10. This array is space-encoded in electro-optic encoder 11. The space coding for this example requires eight separate images of the face (or other surface being mapped) to be sequentially recorded by data acquisition and recorder function 13 for each recording direction. The total recording time from one direction is a minimum of 1/30th second per image, or 8/30th seconds for the entire scene. A 512×512 pixel standard video raster scanning camera with 64 grey scale levels, and 8 charge coupled device (CCD) memories, acquires and records the scene. Each CCD memory stores one digitized image. The stored data is transferred to the computer (block IV) where a 3-D numerical topographic map is generated of the scene (the object's surface) and further analysis is accomplished per application need. For other applications, other arrays may be used, such as 64×64 or 256×256 etc., requiring a different video resolution, such as 1024×1024, and a number (N) of images of each scene; $N = 1 + \log_2 R$ where R is the number of rows or columns in the beam array (see the following Mathematical Outline). A different number of grey scale levels may also be adjusted as required for other applications. Provisions may also be made where non-raster video cameras are used as scene recorders. CID, PROM, RAM and other memory storage methods may be used in place of the CCD.

Decoding, topographic mapping, and analysis

In the following Mathematical Outline the generation of the 3-D numerical topographic map and extraction of topographic information is described. Any minicomputer system (or larger) should be capable of interfacing with the data acquisition and recorder functions to achieve the results described, and programming can be accomplished given the mathematical outline description. Computer programs (for example for graphics manipulations) are available or can be specifically written for further processing of data after obtaining the numerical topographic map data. Interactive feedback, and the number of shutter patterns and images necessary for each scene direction is described.

The following is a mathematical outline of surface reconstruction from images of a space-coded scene.

Given

1. Laser projection of rectangular array of M×N beams, with each beam specified by its position of intersection of the shutter plane, that is, by (u,v).
2. The location (x',y') in the camera plane of the image of each laser beam. A beam illuminates a surface or object at the (unknown) space location (x,y,z).
3. A space coding scheme (sequence of coded patterns of the laser beam array) to determine the value of u for each laser beam image, that is, to automatically correlate a bright dot seen in the TV camera with the shutter column u of the laser beam which illuminated that spot.

Problem

Find 1. the 3-D spatial position (x,y,z) of each spot of the surface or object illuminated by a laser beam of the array
2. the value v of the laser beam, so that for each laser beam we know its location (u,v) in the shutter plane, its image location (x',y') in the camera plane, and the spatial location (x,y,z) of the surface spot that it illuminates.

Space Coding

A 2-D TV image of a surface usually does not contain sufficient information to determine the 3-D locations of the surface points. Space coding inserts information into a scene by rapidly projecting a sequence of dot matrix patterns onto the surface of interest. A TV camera records the image (appearance) of the scene for each projected pattern in the coding sequence. The minimum number of patterns (also TV images) required for coding a surface is proportional to the logarithm of the number of columns (more generally, point sets) that must be distinguished in the dot matrix. For a dot matrix with N columns we must project and image $1+\log_2 N$ coded patterns if we are to determine the (x,y,z) position of each dot appearing on the surface. For an $8\times 8$ dot matrix (64 distinct surface sample points), four coded patterns of the matrix must be projected and imaged. For a $128\times 128$ dot matrix (16,384 distinct surface sample points), eight coded patterns of the matrix must be projected and imaged. Thus a significant increase in the surface resolution (the number of projected dots) can be achieved with only a small increase in the number of coded patterns and images.

By way of example, suppose we project an $8\times 8$ dot matrix on a surface (to sample the surface at 64 distinct points). Then to determine the precise x,y,z location of each matrix dot, four coded patterns of the $8\times 8$ matrix must be projected and imaged. The first pattern projected in the coding sequence is the fully-illuminated dot matrix; the tv image of the entire dot matrix is used to identify the surface points (dots) visible from the chosen camera angle. The second pattern illuminates only the left half (that is, the higher numbered columns 5, 6, 7 and 8) of the projected dot matrix. The third pattern illuminates columns 8, 7, 4 and 3. The fourth pattern illuminates only the even-numbered columns. Thus a dot which appears on the first, second, and third tv images but not on the fourth is given the designation 110 corresponding to its appearance or absence on the second, third, and fourth projected patterns respectively. The code 110 is the binary number 5, which means the dot appears in column 6 (since the first column has designation 000, we must add unity to the binary number to obtain the ordinal number of the column; it is less confusing to label the rightmost column as column zero.). From this example, the principle should be clear. The resolution of a $128\times 128$ dot matrix on a surface (that is, a surface sampling of over 16,000 points) requires a sequence of eight coded illumination patterns of the projected dot matrix. Such a sequence can be projected, rastered, and stored in about a second or less.

In FIGS. 8a, 8b, 8c and 8d we illustrate the basic idea of our space coding method. The upper left corner shows a $4\times 4$ pattern of laser dots viewed from above. Three laser dots A, B, and C are specifically labelled. Suppose we project three patterns ($=1+\log_2 4$) of laser dots parallel and downward onto the scene of the upper left and then image these patterns from another perspective. The first pattern consists of the entire $4\times 4$ matrix array and is observed in image 1. (Only the images of dots A, B, C are shown). Since dots A, B, C are all visible to the camera, there are (in this case) no obstructions of background dots for foreground peaks and rises of the surface. The second pattern projects dots only on columns 11 and 10 of the scene and the third pattern projects dots on columns 11 and 01. Point A of image 1 also appears in image 2 but not in image 3. Point B appears in image 3 but not in image 2, and point C appears in neither image 2 nor image 3. The space code of a laser dot appearing first in image 1 is just the two-bit binary number with the bits corresponding to the appearance (1) on non-appearance (0) of the dot in images 2 and 3. This is shown by the following table:

| Image dot | Image 2 | Image 3 | Image 1 |
|---|---|---|---|
| A | 1 | 0 | 1 |
| B | 0 | 1 | 1 |
| C | 0 | 0 | 1 |

-continued

The binary number of the space code gives the column of the scene on which the laser dot fell. For N columns of dots, the code would require $\log_2 N$ bits, thus $\log_2 N$ patterns and associated TV images plus an initial full dot pattern and image to identify the visible dots.

The TV image (x*, y*) of a point (x,y,z) in the scene is given by the (perspective transformation $$(T_{11}-T_{14}x^*)x \times (T_{21}-T_{24}x^*)y+(T_{31}-T_{34}x^*)z+(T_{41}-T_{44}x^*)=0$$

$$(T_{12}-T_{14}x^*)z+(T_{22}-T_{24}Y^*)y+(T_{32}-T_{34}y^*)z+(T_{42}-T_{44}y^*)=0$$

where the transformation parameters $T_{ij}$ contain the information about the camera: orientation and offset, scale factor, lens focal length, etc. The parameters $T_{ij}$ are wellknown in stereophotogrammetry and computer graphics. We are using the notation of I. E. Sutherland, Proc. IEEE, vol. 62, 2, pp. 453–461, April 1974, and D. F. Rogers and J. A. Adams, *Mathematical Elements for Computer Graphics*, McGraw-Hill Book Company, 1976. The parameters $T_{ij}$ can also be derived from the discussion in R. O. Duda and P. E. Hart, *Pattern Classification and Scene Analysis*, Wiley Books, 1973.

In our example of parallel downward beam projection, the space code provides the value of x for each laser dot. If the scene-to-image transformation matrix T is known and the columns are space coded, we have for each laser dot visible to the TV camera the known quantities $T_{ij}$, x*, x and two equations for the two unknowns y and z. For a well-conditioned solution, the camera must be some angle away from the y-z plane and such that the two lines in the y-z plane corresponding to these two equations are not nearly parallel.

We have just discussed the very special case of parallel downward beam array projection. In a more general case, the laser beams can be divergent and need not shine straight down on a surface. We can then conceptualize the laser array of $N^2$ beams as a "reverse camera" which projects from the "image" (shutter) plane to the scene. Instead of being given the value x (of a point in the scene) by the space code we are now given another "perspective" transformation for the laser beam array.

$$(L_{11}-L_{14}u)x+(L_{21}-L_{24}u)y+(L_{31}-L_{34}u)z+(L_{41}-L_{44}u)=0$$

$$(L_{12}-L_{14}v)x+(L_{22}-L_{24}v)y+(L_{32}-L_{34}v)z+(L_{42}-L_{44}v)=0$$

where L is the scene-to-laser transformation matrix (analogous to T but for the laser), (u,v) identifies the particular beam in the projected beam array (coordinates of beam intersections of the shutter plane), and (x,y,z) is (as before) the position on the surface (in the scene) that the laser beam hits. The space coding now associates with each point seen in the camera image the corresponding shutter column u of the laser beam array. Ignoring the second equation (since we do not yet known the shutter row v associated with a given image point) and assuming the matrix L is known, we solve the two equations given earlier for the camera together with the first equation for the laser beam array to obtain the three unknowns x, y, z. That is, we are given $T_{ij}$, $L_{ij}$, $x^*$, $y^*$, u and solve the first three equations of this section for the three unknowns, x, y, z (provided the equations are non-singular). The camera equations by themselves give two equations for three unknowns and thus determine only the ray from the camera to the scene. The first equation for the laser "perspective" transformation (with u given by the space code) provides the plane which intersects the ray from the camera. Clearly, a well-conditioned solution x, y, z requires that the laser and camera positions and the space-coding planes u=-const) are such that the solution rays from the camera are not nearly parallel to the mathematical planes determined by $L_{ij}$ and u=constant. Points in the scene very distant from both the camera and the laser source positions will be ill-conditioned (inaccurate). Thus our proposed system has a limited range of accuracy which depends primarily on the camera-laser separation distance. Once we find x, y, z, we can calculate u from the last equation so that we can later determine which laser beams (u,v) have been imaged. The parallel downward beam projection illustrated in FIG. 8 is the special case $L_{ij}=1$ if i=j and $L_{ij}=0$, if i=j, so that x=u.

The space code method, which allows us to use only one camera (if all the dots of interest are visible) should be compared with the case of sterophotogrammetry in which one must use two cameras and know the corresponding transformation matrices $T_{ij}$ for both cameras and the corresponding image points ($x_1^*$, $y_1^*$) for the same unknown point (x, y, z) of the scene; hence four equations are solved for the three unknowns x, y, z with inconsistencies treated by least squares.

Transformation Parameters

Several methods can be used to obtain the transformation parameters $T_{ij}$ and/or $L_{ij}$. The transformation matrix L can be assumed known from sensors and measurements of the laser beam or can be found by flashing particular laser beams ($u_a$, $v_a$) onto six non-coplanar points of known location ($x_a$, $y_a$, $z_a$) where a=1, . . . , 6. We then have 12 equations from the 12 unknown $L_{ij}$. Similarly, to find the transformation matrix T we need to insert six non-coplanar reference points in the scene 16,17, that is, six non-coplanar reference points each of known location ($x_a$, $y_a$, $z_a$) and image position ($x_a^*$ $y_a^*$). (The six points can be those just mentioned to find the laser matrix L). We then have 12 equations for the unknowns $T_{ij}$. If there is a reference region in the scene, the transformation matrices T and L can be found automatically.

It is also possible to fine T for the camera given L for the laser without introducing any known points into the scene itself. In this case the unknowns are x, y, z for each point in the scene used for calibration together with the 12 unknown $T_{ij}$. For each point (x, y, z) we solve the two laserequations and obtain one equation for a ray with a single unknown parameter. The problem then reduces to solving the 12 unknowns $T_{ij}$ and as many unknown parameters as there are rays (dots in the scene) used for calibration. For each calibration ray we introduce one unknown and obtain two equations. With 12 calibration rays we would have 24 unknowns (12 for $T_{ij}$ and 12 unknown parameters) and 24 equation. Although the equations are nonlinear in complete generality, some a priori knowledge can be assumed and iterative methods can be used to find the $T_{ij}$.

The easiest situation of all would be to do all calculations relative to a coordinate system fixed to the laser projector and to sense independently the camera orientation and other parameters with respect to this reference frame. Again, no reference points in the scent would be required.

THE ALGORITHM

1. The user selects or fixed the parameters of the dot array to be projected on the scene (assume N columns of dots are chosen).
2. The operator points the laser and the cameras to some area of the scene. (There is no need to predetermine the coordinate transformations by arduous calibration).
3. The operator pushes a button and the computer takes over the rest of procedure.
4. The computer automatically projects a sequence of $(1+\log_2 N)$ coded dot patterns for coding by columns.
5. the corresponding TV images of each projected coded dot pattern are obtained
6. In each image, the brightness peaks (laser dot images) are located.
7. The space code of each laser dot is found by comparing brightnesses at corresponding dot locations in consecutive images from a given perspective.
8. The parameters of the scene-to-image and/or laser-to-scene coordinate transformations are calculated automatically either (a) by recognizing reference points in the scene, (b) knowing the laser parameters and solving for the camera parameters without introducing reference points in the scene, or (c) using laser coordinates and being able to determine the camera orientation and parameters with respect to those coordinates.
9. The (x,y,z) location of each visible laser dot and the (u,v) identity of any unseen laser beam are found and recorded.

Error checks are built into every step of the algorithm.

Although the present invention has been described with reference to a specific embodiment it is not intended that the same should be taken in a limiting sense. Accordingly, it is understood that the scope of the invention in its broader aspects be defined by the appended claims only and no limitation is to be inspired from the definitive language used in describing the preferred embodiment.

What is claimed is:

1. Apparatus for providing three dimensional location information relative to a coordinate system for selected points on a remote surface, said apparatus comprising a source of illumination for providing light beam illumination of said surface, said source of illumination comprising means for providing an array of light beams, a scene recording device for providing surface scene images from an aspect angle other than parallel or normal to said light beam, each said surface scene image having an x,y coordinate system correlated with the surface x,y coordinate system, the elevation dimension of the surface at any selected illuminated x,y coordinate position being a function of (a) the displacement of the corresponding imaged spot from its x,y coordinates, (b) the scene recording device aspect angle and (c) surface to image coordinate system conversion factors, and space coding means for correlating spots illuminated by said array of light beams with spots imaged by said scene recording device.

2. Apparatus for providing three dimensional elevation information as defined in claim 1 wherein said space coding means comprises means for selectively modulating the illumination of each light beam in said array of light beams.

3. Apparatus for providing three dimensional location information as defined in claim 3 wherein the aspect angle of said scene recording device is not aligned with an x or y coordinate, said source of illumination provides an array of light beams of n rows and m columns, rows and columns being aligned with x and y coordinates respectively, columns having binary number identification, said means for selectively modulating the illumination of each light beam sequentially effecting illumination with (a) all columns of light beams, (b) with the higher numbered half of the columns of light beams, and subsequently (c) with the higher numbered halves of each previously illuminated and non-illuminated halves of light beam columns until alternate columns are illuminated, a binary 1 or 0 being registered for the occurence or non-occurence respectively of a given beam for each step of the sequence with the total binary numbered accrued for that beam identifying its column.

4. Apparatus for providing three dimensional location information as defined in claim 2 wherein said means for providing an array of light beams comprises
a source of coherent light,
an optical vertical fringe generator, and
an optical horizontal fringe generator, coherent light from said source of coherent light being directed through said vertical and horizontal fringe generators in series and emerging therefrom as an array of discrete coherent light beams.

5. Apparatus for providing three dimensional location information as defined in claim 4 including means for collimating said array of discrete coherent light beams.

6. Apparatus for providing three dimensional location information as defined in claim 5 wherein said means for selectively modulating the illumination of each light beam in said array of light beams comprises an array of shutter elements, each shutter element intercepting one beam of said array of light beams, and means for selectively opening and closing said shutter elements.

7. Apparatus for providing three dimensional location information as defined in claim 6 wherein said shutter elements are mechanically actuated slits.

8. Apparatus for providing three dimensional location information as defined in claim 6 wherein said shutter elements are liquid crystal gate.

9. Apparatus for providing three dimensional location information as defined in claim 6 wherein said shutter elements are electro-optical crystal gates.

10. Apparatus for providing three dimensional location information as defined in claim 6 wherein said scene recording device comprises a video camera.

11. Apparatus for providing three dimensional location information as defined in claim 10 including a coder electronics circuit, an analog/digital converter for digitizing the output of said video camera, a memory for each video camera image in a space code sequence, said memories being fed from said analog/digital converter, and a microprocessor for providing surface x, y, z coordinate information from images stored in said memories in response to commands from said coder electronics circuit.

12. Apparatus for providing three dimensional location information as defined in claim 11 including means for providing operation of said scene recording device at various x, y coordinate frame aspect angles.

13. The method of determining x, y, z coordinate information for a remote surface relative to a reference plane comprising the steps of
illuminating the surface with an array of light beams to effect a discrete pattern of light spots thereon,
recording an image of the surface scene from a polar aspect angle differing from the light beam angle,
correlating image light spots with corresponding surface light spots and light beams, and
determining x,y,z coordinate information as a function of image spot displacement, image recording aspect angle and image to surface conversion factors.

14. The method of determining x, y, z coordinate information defined in claim 13 wherein image light spots are correlated with corresponding surface light spots and light beams by space coding said array of discrete light spots.

15. The method of determining x, y, z coordinate information defined in claim 14 including the step of recording images of the surface scene from additional aspect angles to determine the location and elevation of positions illuminated by light spots obstructed from imaging by interfering surface topography.

16. Apparatus for automatically providing unambiguous three dimensional location information relative to a coordinate system for selected points on a remote surface, said apparatus comprising
a source of illumination for providing an array of light beams to illuminate spots at selected x,y coordinate positions on said remote surface,
shutter means for controlling said light beams,
programmable shutter control means controlling said shutter means in accordance with a given space code,
a scene recording device for providing surface scene images from an aspect angle other than parallel or normal to light beam direction,
means for synchronizing said scene recording device with said programmable shutter control means,
means for decoding coded images recorded by said scene recording device,
means for calculating from said decoded image data illuminated surface positions in three dimensions, and
means for providing a output responsive thereto in the form of three dimensional image information.

17. Apparatus for automatically providing unambiguous three dimensional location information as defined in claim 16 including means for determining light beams which illuminate surface points hidden from said scene recording device.

18. Apparatus for providing three-dimensional information relative to a coordinate system for selected points on a remote surface, said apparatus comprising,
a single source of laser light illumination for providing an initial coherent light beam,
lens means to decollimate said coherent light beam,
first and second shearing plates in intercepting relationship with the decollimated coherent light beam in which the coherent light beam reflects off the front and back surfaces of said first shearing plate and then off the front and back surfaces of said shearing plate to generate an array of a large multiplicity of individual laser beams simultaneously, said array of laser beams comprising a ordered predetermined array, the individual beams in said array having the same properties as the initial laser beam and the pattern of beams generated being a product of diffraction, said pattern being distinguishable at very close and very far distances and not degraded by diffraction limitations, the laser beams in said array being projected to intercept the surface of an object and illuminate discrete spots on x, y coordinate positions, thereon, a scene recording device for providing surface scene images from an aspect angle other than parallel or normal to said initial coherent light beam, each said surface scene image having an x, y coordinate system correlated with the surface x, y coordinate system, the elevation dimension of the surface at any selected illuminated x, y coordinate position being a function of (a) the displacement of the corresponding imaged spot from its x, y coordinates, (b) the scene recording device aspect angle and (c) surface to image coordinates system conversion factors, a processing device to calculate x, y, z coordinates of selected points on said object surface, and output means for indicating the x, y, z coordinates of said selected points.

19. Apparatus for providing three-dimensional information as defined in claim 21 including shutter means for blocking individual beams of laser light in said array of laser beams whereby rows and columns and portions of rows and columns are selectively blocked.

20. Apparatus for providing three-dimensional information as defined in claim 19 including computer means and wherein said shutter means operates to block different columns and rows of laser light beams in a predetermined set of patterns and blocks any number of columns and rows by computer selection including columns together, interspaced and combinations of sets of columns and rows together, interspaced and combinations and sets of rows, and wherein said computer means synchronizes the changing of the blocking collumns by the shutter means between the starting and ending of a recording of an image, such that the shutter means changes the number and arrangement of columns and rows blocked only during the interval between image recording by the image recording device.

21. Apparatus for providing three-dimensional information as defined in claim 20 wherein said shutter means is operated in response to a binary code.

* * * * *